United States Patent
Lee et al.

(10) Patent No.: US 7,930,137 B2
(45) Date of Patent: Apr. 19, 2011

(54) AVAILABILITY PREDICTION METHOD FOR HIGH AVAILABILITY CLUSTER

(75) Inventors: Yong-Ju Lee, DaeJeon (KR); Ok-Gee Min, DaeJeon (KR); Chang-Soo Kim, DaeJeon (KR); Yoo-Hyun Park, DaeJeon (KR); Choon-Seo Park, DaeJeon (KR); Song-Woo Sok, DaeJeon (KR); Jin-Hwan Jeong, Seoul (KR); Won-Jae Lee, DaeJeon (KR); Hag-Young Kim, DaeJeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 27 days.

(21) Appl. No.: 12/184,707

(22) Filed: Aug. 1, 2008

(65) Prior Publication Data

US 2009/0150717 A1    Jun. 11, 2009

(30) Foreign Application Priority Data

Dec. 10, 2007  (KR) .................. 10-2007-0127904

(51) Int. Cl.
  *G06F 17/18*  (2006.01)
(52) U.S. Cl. .................. 702/179; 702/181; 702/182
(58) Field of Classification Search .................. 702/179, 702/181–182; 700/93; 710/17; 714/1
  See application file for complete search history.

(56) References Cited

U.S. PATENT DOCUMENTS 7,228,460 B2 *  6/2007  Pomaranski et al. ........... 714/43
  2006/0136772 A1  6/2006  Guimbellot et al.

FOREIGN PATENT DOCUMENTS

| KR | 10-0404906 | 10/2003 |
|----|------------|---------|
| KR | 10-2006-0068873 | 6/2006 |
| KR | 10-0693663 | 3/2007 |

OTHER PUBLICATIONS

Feng et al., 'A State Replication Scheme for Stateful High Availability Cluster', Jul. 2007, IEEE Publicaton, p. 1298-1303.*
Page, 'Probability for Engineering with Applications to reliability', 1989, pp. 1-7 (copes of pp. 32-45).*
Park et al., 'A New Availability Concept for (n, k)—way Cluster Systems Regarding Waiting Time', 2003, Springer-Verlag, pp. 998-1005.*
Chokchai Leangsuksun et al., "The Modeling and Dependability Analysis of High Availability Oscar Cluster System", Proceeding of the $17^{th}$ Annual International Symposium on High Performance Computing Systems and Applications, May 2003, 5 pages.
Korean Office Action mailed May 28, 2010 in Korean Application No. 10-2007-0127904.

* cited by examiner

*Primary Examiner* — Michael P Nghiem
*Assistant Examiner* — Elias Desta
(74) *Attorney, Agent, or Firm* — Staas & Halsey LLP

(57) ABSTRACT

Provided is an availability prediction method for a high availability. The method includes calculating a basic survival probability that the other node survives until a failure on one node of two nodes constituting a cluster is fixed, and determining an optimal number of nodes meeting a preset reference availability probability by calculating an availability probability for a predetermined range of the number of nodes on the basis of the basic survival probability. The method determines the number of nodes in the high availability cluster so as to match a reference availability probability, and is able to accomplish an optimal configuration of a cluster by calculating the availability probabilities for combinations between active node and passive nodes and between head nodes and switches.

3 Claims, 10 Drawing Sheets

FIG. 3

| NODE STATE | | | | | SURVIVAL STATE | |
|---|---|---|---|---|---|---|
| 1 | 0 | 0 | 0 | 0 | Success ( 4 > 3 ) | $P_1^4$ |
| 1 | 0 | 0 | 0 | 1 | Success ( 3 = 3 ) | $P_1^3*(1-P_1)$ |
| 1 | 0 | 0 | 1 | 0 | Success ( 3 = 3 ) | $P_1^2*(1-P_1)*P_1$ |
| 1 | 0 | 0 | 1 | 1 | Fail ( 2 < 3 ) | 0 |
| 1 | 0 | 1 | 0 | 0 | Success ( 3 = 3) | $P_1*(1-P_1)*P_1^2$ |
| 1 | 0 | 1 | 0 | 1 | Fail ( 2 < 3 ) | 0 |
| 1 | 0 | 1 | 1 | 0 | Fail ( 2 < 3 ) | 0 |
| 1 | 0 | 1 | 1 | 1 | Fail ( 1 < 3 ) | 0 |
| 1 | 1 | 0 | 0 | 0 | Success ( 3 = 3 ) | $(1-P_1)*P_1^3$ |
| 1 | 1 | 0 | 0 | 1 | Fail ( 2 < 3 ) | 0 |
| 1 | 1 | 0 | 1 | 0 | Fail ( 2 < 3 ) | 0 |
| 1 | 1 | 0 | 1 | 1 | Fail ( 1 < 3 ) | 0 |
| 1 | 1 | 1 | 0 | 0 | Fail ( 2 < 3 ) | 0 |
| 1 | 1 | 1 | 0 | 1 | Fail ( 1 < 3 ) | 0 |
| 1 | 1 | 1 | 1 | 0 | Fail ( 1 < 3 ) | 0 |
| 1 | 1 | 1 | 1 | 1 | Fail ( 0 < 3 ) | 0 |

[a] 0=Active node, 1=Down node
[b] Success if number of active nodes is equal or larger than quorum number. Fail if not.

FIG. 4

| NODE | QUORUM | AVAILABILITY PROBABILITY | |
|---|---|---|---|
| 2 node | 2 | 0.99750000 | $= P_1$ |
| 3 node | 2 | 0.99500625 | $= P_1^2$ |
| 4 node | 3 | 0.99251873 | $= P_1^3$ |
| 5 node | 3 | 0.99996262 | $= P_1^4 + (1-P_1)*P_1^3 *4$ |
| 6 node | 4 | 0.99993781 | $= P_1^5 + (1-P_1)*P_1^4 *5$ |
| ... | | | |
| n node | $Q^n$ | $P^n$ | |

FIG. 10

| Configuration \ MTTF[a] | 1 week | 2 week | 1 month | 3 month | 6 month | 1 year | 2 year |
|---|---|---|---|---|---|---|---|
| 1*Active+1*Passive | 0.875 | 0.933333333 | 0.967741935 | 0.989159892 | 0.994550409 | 0.997267770 | 0.998632011 |
| 2*Active | 0.982372301 | 0.995214807 | 0.998903533 | 0.999873692 | 0.999963356 | 0.999990617 | 0.999997176 |
| 1*Active+2*Passive | 0.997403303 | 0.999612258 | 0.999941076 | 0.999991089 | 0.999996031 | 0.999998077 | 0.999999046 |
| 2*Active+1*Passive | 0.997403251 | 0.999612276 | 0.999941078 | 0.999991089 | 0.999996031 | 0.999998077 | 0.999999046 |
| 3*Active | 0.997403283 | 0.999612277 | 0.999941078 | 0.999991089 | 0.999996031 | 0.999998077 | 0.999999046 |
| 1*Active+3*Passive | 0.999544107 | 0.999926247 | 0.999975665 | 0.999992375 | 0.999996194 | 0.999998097 | 0.999999049 |
| 2*Active+2*Passive | 0.999544146 | 0.999926625 | 0.999975666 | 0.999992376 | 0.999996194 | 0.999998097 | 0.999999049 |
| 3*Active+1*Passive | 0.998900365 | 0.999950385 | 0.999976352 | 0.999992376 | 0.999996195 | 0.999998097 | 0.999999049 |
| 4*Active | 0.999544152 | 0.999926251 | 0.999976251 | 0.999992376 | 0.999996194 | 0.999998097 | 0.999999049 |
| 1*Active+4*Passive | 0.999849849 | 0.999948674 | 0.999976813 | 0.999992379 | 0.999996195 | 0.999998097 | 0.999999049 |
| 2*Active+3*Passive | 0.999849862 | 0.999948676 | 0.999976813 | 0.999992379 | 0.999996195 | 0.999998097 | 0.999999049 |
| 3*Active+2*Passive | 0.999849864 | 0.999948677 | 0.999976813 | 0.999992379 | 0.999996195 | 0.999998097 | 0.999999049 |
| 4*Active+1*Passive | 0.999849864 | 0.999948677 | 0.999976813 | 0.999992379 | 0.999996195 | 0.999998097 | 0.999999049 |
| 5*Active | 0.999849864 | 0.999948677 | 0.999976813 | 0.999992379 | 0.999996195 | 0.999998097 | 0.999999049 |
| more[b] | | | | | | | |

[a] Mean Time To Failure ($=\frac{1}{\lambda}$) is varied, Mean Time To Repair ($=$half day$=\frac{1}{\delta}$) and Mean Time To FailOver ($=$1 minute$=\frac{1}{\tau}$) are fixed.
[b] more nodes has minor different values.

AVAILABILITY PREDICTION METHOD FOR HIGH AVAILABILITY CLUSTER

CROSS-REFERENCE TO RELATED APPLICATIONS

This application claims priority under 35 U.S.C. §19 to Korean Patent Application No. P2007-127904, filed on Dec. 10, 2007, the disclosure of which is incorporated herein by reference in its entirety.

BACKGROUND OF THE INVENTION

1. Field of the Invention

The present disclosure relates to an availability prediction method for a high availability cluster, and more particularly, to a method for predicting an availability of a high availability cluster, which can determine an optimal number of nodes meeting a predetermined required availability level and a method for operating the same.

This work was supported by the IT R&D program of MIC/IITA [2007-S-016-01, A Development of Cost Effective and Large Scale Global Internet Service Solution]

2. Description of the Related Art

Generally, a cluster system refers to a system for integratedly managing a virtual image program by grouping a plurality of nodes having the similarity therebetween.

Many researches in various fields such as high availability (HA), load-balancing, high performance computing and grid computing are in progress. Especially, the high availability is an important aspect of a cluster technology for providing services without a failure upon a user's request in today's Internet environment.

A high availability cluster includes one or more nodes to prepare for a failure on any node of them. Moreover, the high availability cluster checks, at any time, a state of an individual node to dynamically remove a failed node in the cluster, allows other nodes to perform a corresponding task in behalf of the failed node, and allows a recovered node to join the cluster again.

FIG. 1A is a block diagram illustrating a configuration of a related art asymmetric cluster system.

Referring to FIG. 1A, the asymmetric cluster system 100 includes a head node 110, a switch node 120, and a compute node 130. The head node 110 monitors the compute node 130. The switch node 120 is placed between the head node 110 and the compute node 130. The compute node 130 fulfills a user's request by the head node 110.

The head node 110 distributes cluster-related software, monitors a failure on the compute node 130, and recovers the failed node to optimal system availability. It is very important to minimize failures of the nodes in the practical operation of the cluster system.

The head node 110 includes two Ethernet devices. One fulfills a user's request through a private network connected to the compute 130 via the switch 120, and the other fulfills the user's request through a public network.

The switch 120 provides the head node 100 with a path to the compute node 130 by being connected with the private network.

The compute node 130 carries out a certain operation according to a command of the head node 100 by being connected with the private network.

FIG. 1B is a block diagram illustrating a configuration of a related art high availability cluster system.

Referring to FIG. 1B, the high availability cluster system includes two head nodes 211 and 212, two switches 221 and 222, m number of compute nodes 230_1 to 230_m.

The head nodes 211 and 212 are duplexed. Accordingly, when one of the head nodes 211 and 212 is failed, the failed node may be replaced with the other node.

In this case, since two switches 221 and 222 are used, each of the head nodes 211 and 212 includes three Ethernet devices.

FIG. 2 is a block diagram illustrating a configuration of a general high availability cluster system.

Referring to FIG. 2, the high availability cluster system includes a plurality of head nodes 250_1 to 250_n, a plurality of switches 260_1 to 260_1, a plurality of compute nodes 270_1 to 270_m. "Number of nines", which is a value indicating availability, varies with the number n of the head nodes 250_1 to 250_n.

The availability value varies with the number n of the nodes, the number of active and passive nodes, or a configuration of the nodes (e.g., where the cluster system may be constituted of only head nodes, or the head nodes and the switches nodes).

The larger is the number of nodes, the higher is availability probability of the high availability cluster system. However, since there is a limitation to the number of the nodes, it is necessary to design a system in consideration of the availability probability in accordance with the number of the nodes prior to the system construction.

SUMMARY

Therefore, an object of the present invention is to provide an availability prediction method for a high availability cluster, which can determine an optimal number of nodes and an operating method meeting a predetermined level of an availability probability.

To achieve these and other advantages and in accordance with the purpose(s) of the present invention as embodied and broadly described herein, an apparatus a method for predicting an availability of a high availability cluster in accordance with an aspect of the present invention includes: calculating a basic survival probability that the other node survives until a failure on one node of two nodes constituting a cluster is fixed; and determining an optimal number of nodes meeting a preset reference availability probability by calculating an availability probability for a predetermined range of the number of nodes on the basis of the basic survival probability.

To achieve these and other advantages and in accordance with the purpose(s) of the present invention, an apparatus a method for predicting an availability of a high availability cluster in accordance with another aspect of the present invention includes: enumerating all configurations of a cluster system capable of being constituted of one or more active nodes and the number of passive nodes omitting the number of active nodes from the number of an entire nodes; calculating an availability probability for each of the enumerated configurations; and determining a combination between the nodes when the availability probability is the maximum value as an optimal configuration of the cluster.

To achieve these and other advantages and in accordance with the purpose(s) of the present invention, a method for predicting an availability of a high availability cluster in accordance with another aspect of the present invention includes: enumerating all configurations of a cluster system variable with the number of head nodes and the number of switches; calculating an availability probability for each of the enumerated configurations; and determining a combination between the head nodes and the switches when the availability probability is the maximum value as an optimal configuration of the cluster.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 3 is a table illustrating an availability probability of a node according to an embodiment of the present invention;

FIG. 4 is a table illustrating an availability probability of an availability cluster system according to an embodiment of the present invention;

FIG. 10 is a table illustrating an availability probability prediction according to variation of MTTF in a variable active and passive node establishment according to an embodiment of the present invention;

DETAILED DESCRIPTION OF EMBODIMENTS

Figure 1A:
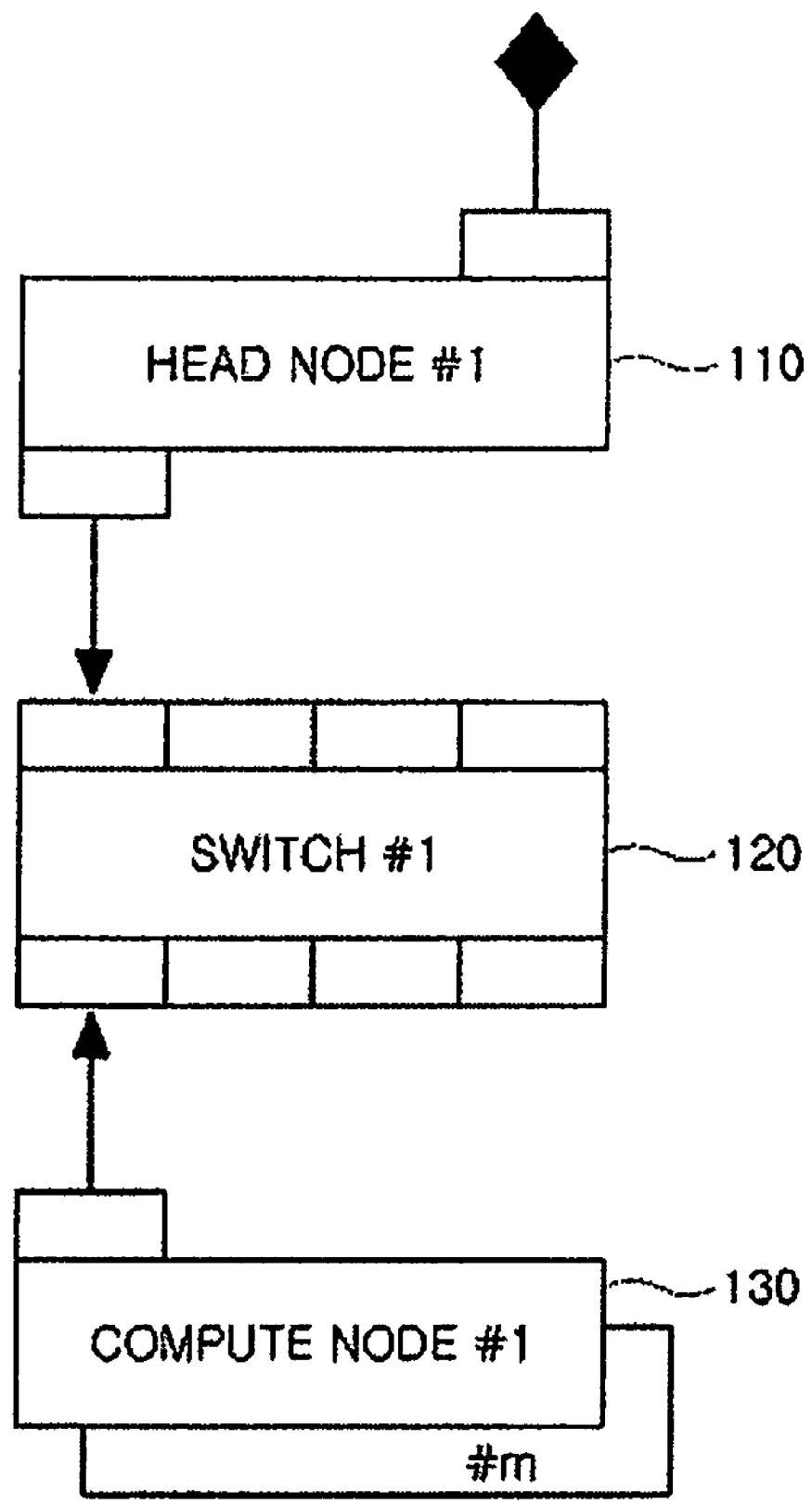
FIG. 1A is a block diagram illustrating a configuration of a related art asymmetric cluster system.
Figure 1B:
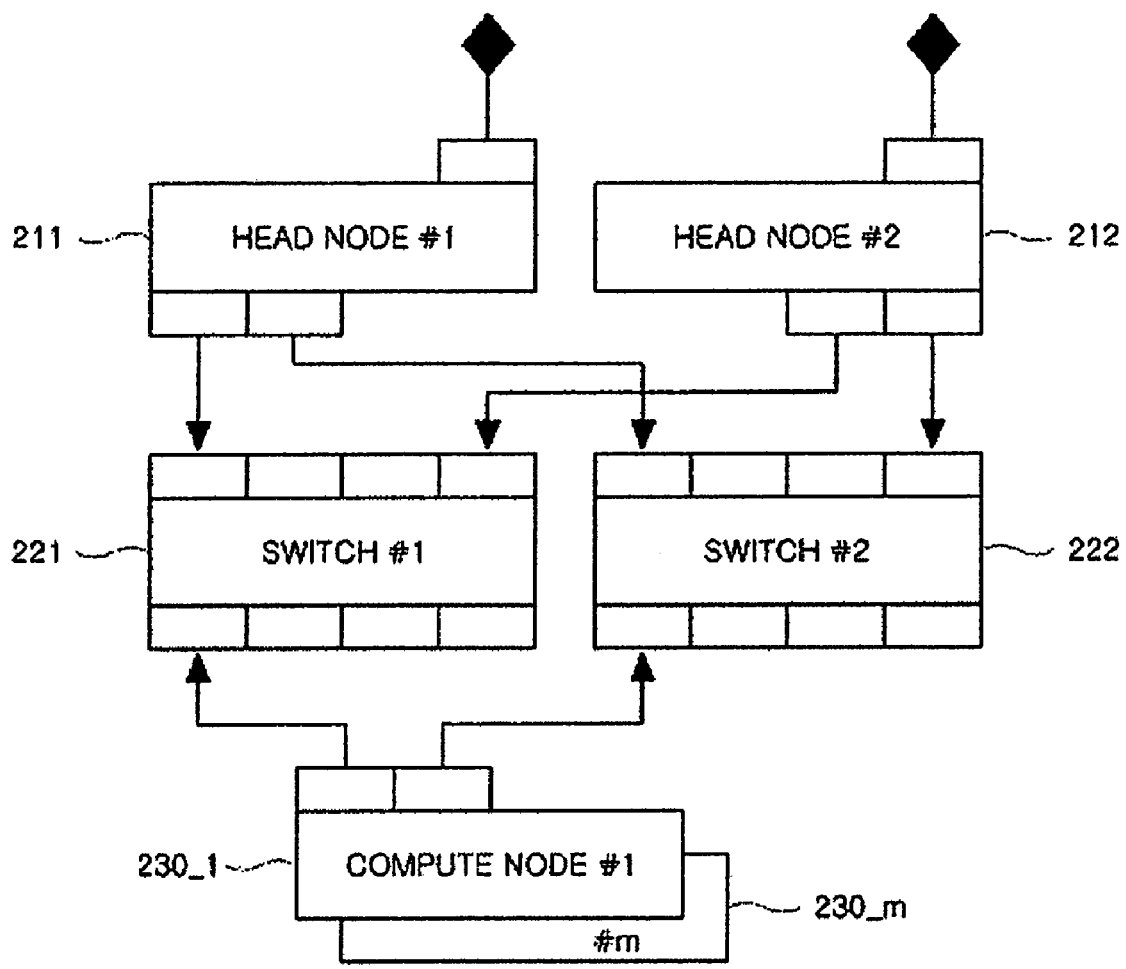
FIG. 1B is a block diagram illustrating a configuration of a related art high availability cluster system.
Figure 2:
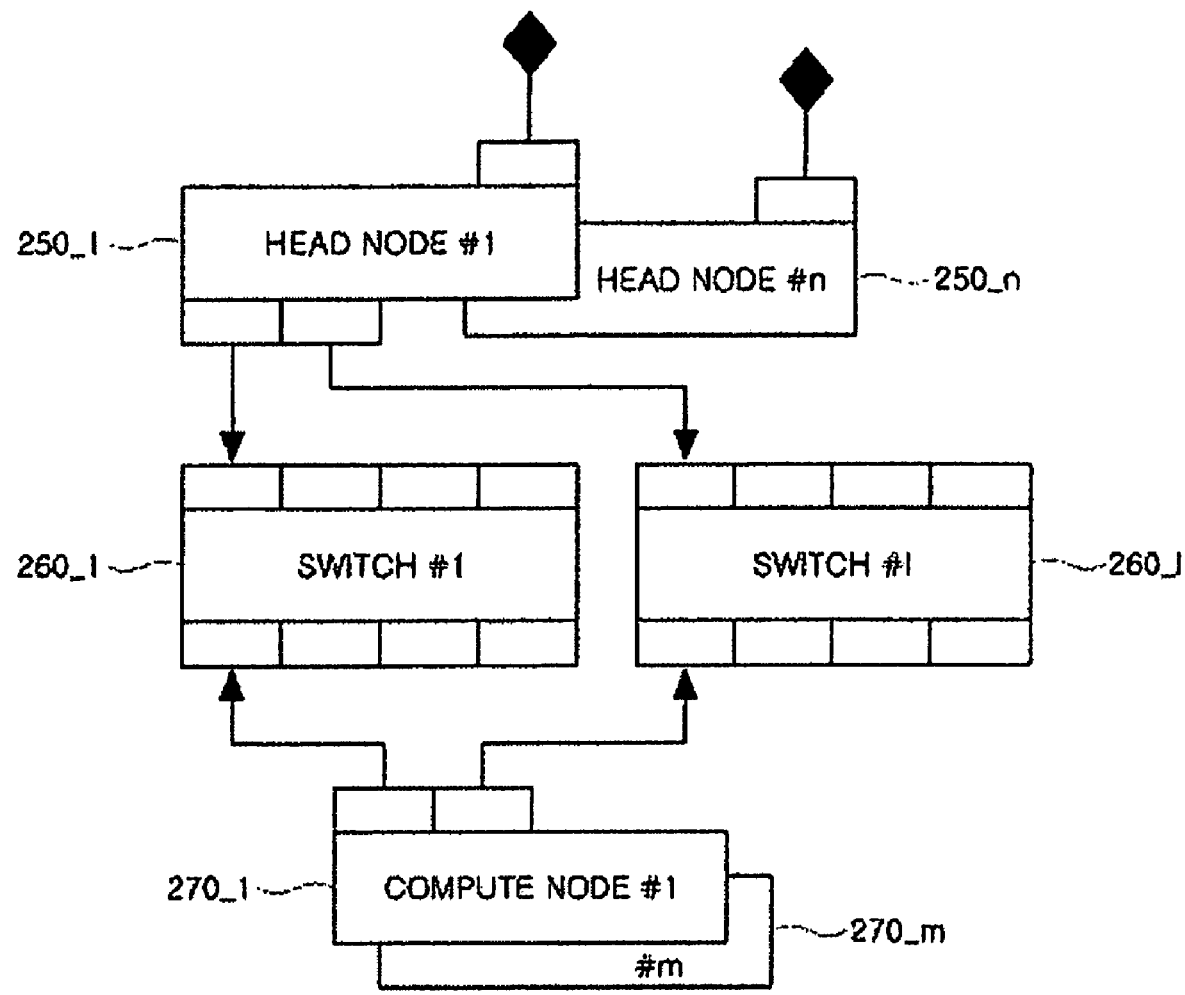
FIG. 2 is a block diagram illustrating a configuration of a general high availability cluster system.

Hereinafter, specific embodiments will be described in detail with reference to the accompanying drawings. The present invention may, however, be embodied in different forms and should not be construed as limited to the embodiments set forth herein.

FIG. 3 is a table illustrating an availability probability of a node according to an embodiment of the present invention, which illustrates the availability probability in a survival probability of five nodes.

Referring to FIG. 3, a node state 310 of whether each of nodes is operating or not is expressed in a binary code of 1-bit.

That is, an active node is expressed in a binary code "0", and a down node is expressed in a binary code "1".

On the other hand, it is apparent that the active node and the down node may be expressed in a binary code "1" and "0", respectively, and the node state 310 may be expressed in a binary code of 2 or more bits.

A survival state 320 and an availability probability 330 is illustrated by enumerating sixteen (two to the fourth power) cases in which states of 4 nodes are varied on the assumption that one node is a down node.

The survival state 320 indicates whether a current cluster system survives or not, which may be expressed, for example, as "Success" or "Fail".

That is, if the number of the active nodes is enough for a quorum number, the survival state 320 is the success state. If the number of the active nodes is short of the quorum, the survival state 320 is the fail state.

The availability probability ($P_n$) 330 is a probability that other nodes survive until a failed node in a cluster system including (n+1) number of nodes is recovered, which may be calculated by the following equation (1):

$$P_n = P_1^{n-1} + \sum_{k=Q_n}^{n-2} P_1^k (1-P_1)^{n-k-1} \frac{(n-1)!}{(n-k-1)!} \quad (1)$$

$$Q_n = \left[\frac{n+1}{2}\right]$$

As in the above equation (1), when a failure occurs on one node of two nodes, the availability probability ($P_n$) 330 may be obtained from a survival probability $P_1$ that the other node survives until the failed node is recovered.

That is, provided there are two nodes in the cluster system, an availability of the entire system becomes 0% unless a failed node of the two nodes is recovered during a period of the survival probability $P_1$.

In the cluster system including two nodes, the availability probability $P_n$ regarding the two nodes may be considered the survival probability $P_1$ of the cluster system.

Again referring to FIG. 3, since all of four active nodes are active nodes in the first case, the availability probability $P_n$ 330 is $P_1^4$, that is, $P_1$ to the fourth power.

In the second case, since three nodes are the active nodes and one node is the down nodes, the availability probability $P_n$ 330 is the multiple of a survival probability $P_1^3$ of the three nodes and a survival probability $(1-P_1)$ of the other one node.

As in the fourth case, when the survival state 320 of the system is the fail, the availability probability 330 is 0%. An availability probability 330 besides the above cases may be calculated by the manner as described above.

FIG. 4 is a table illustrating an availability probability of an availability cluster system according to an embodiment of the present invention. The table illustrates availability probabilities $P_1$ to $P_n$ when the number of nodes varies from 2 to n, and a quorum number varies from 2 to $Q_n$.

More particularly, when the number of the nodes is 2 and the quorum number is 0, the availability probability is $0.99750000 = P_1$. When the number of the nodes is 3 and the quorum number is 2, the availability probability is $0.99500625 = P_1^2$. When the number of the nodes is 4 and the quorum number is 3, the availability probability is $0.99251873 = P_1^3$. When the number of the nodes is 5 and the quorum number is 3, the availability probability is $0.99996262 = P_1^4 + (1-P_1)*P_1^3*4$. When the number of the nodes is 6 and the quorum number is 4, the availability probability is $0.99993781=P_1^5+(1-P_1)*P_1^4*5$. When the number of the nodes is n and the quorum number is $Q_n$, the availability probability is $P_n$.

Figure 5:
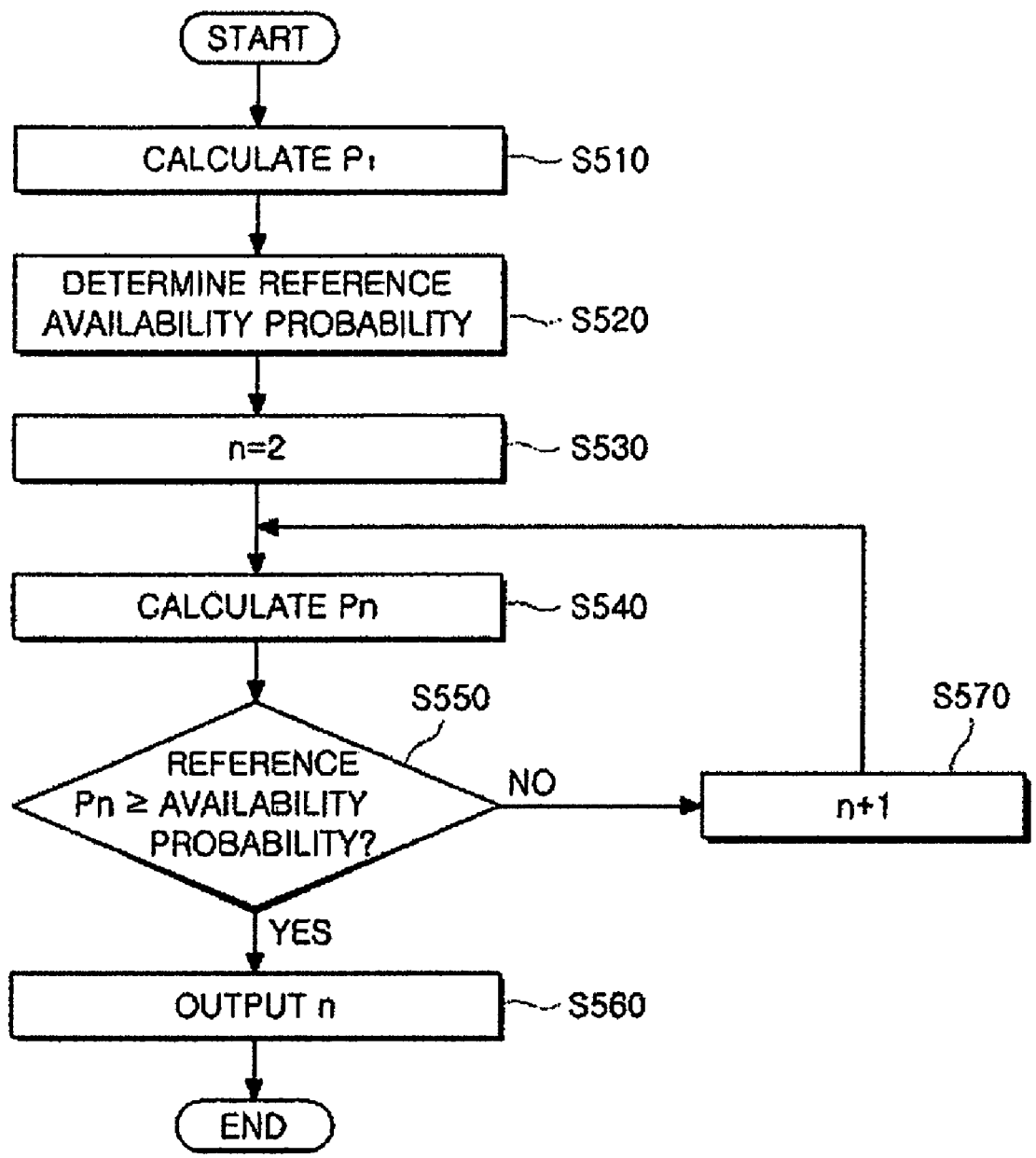
FIG. 5 is a flowchart illustrating a process of obtaining the number n of nodes of a high availability cluster system having an availability probability $P_n$ larger than a reference availability probability according to embodiment of the present invention.

FIG. 5 is a flowchart illustrating a process of obtaining the optimal number n of nodes of a high availability cluster system having an availability probability $P_n$ larger than a reference availability probability according to an embodiment of the present invention. Hereinafter, the process will be described with reference to FIG. 5.

In operation S510, after a failure occurs on one node of two nodes constituting a cluster, a probability $P_1$ that the other node survives is obtained. The P1 may be referred to as a basic survival probability and vary with a system environment. In operation S520, the reference availability probability is determined. It is apparent that the reference availability probability may be implemented prior to operation S510. In the way, after determining a certain reference availability probability, an operation of the optimal number of nodes meeting the reference availability probability may be carried out.

In operation S530, the number of the nodes is initialized to the minimum value of a range by substituting n with 2. Thereafter, in operation S540, an availability probability $P_n$ according to the number of the nodes is calculated as in the equation (1).

$P_n$ is a probability that other nodes survive after the failure occurs on one node of the entire nodes.

It is determined in operation S550 whether the calculated probability $P_n$ is larger than the reference availability probability.

According the determination, if the calculated probability $P_n$ is the same as or larger than the reference availability probability, the number n of nodes n is outputted in operation S560.

On the other hand, if the calculated probability $P_n$ is smaller than the reference availability probability in operation S550, the number of the nodes is increased by a certain unit value (e.g., 1) in operation S570.

Operations S530 through S570 are repeatedly performed until the calculated probability $P_n$ becomes larger than the reference availability probability. Furthermore, although the calculated probability $P_n$ is larger than the reference availability probability, Operations S530 through S570 are repeatedly performed until the number of the nodes becomes the maximum value of the range by increasing the number of the nodes by the certain unit value.

The determined optimal number of the nodes n is used as the number of head nodes constituting an asymmetric cluster.

Figure 6:
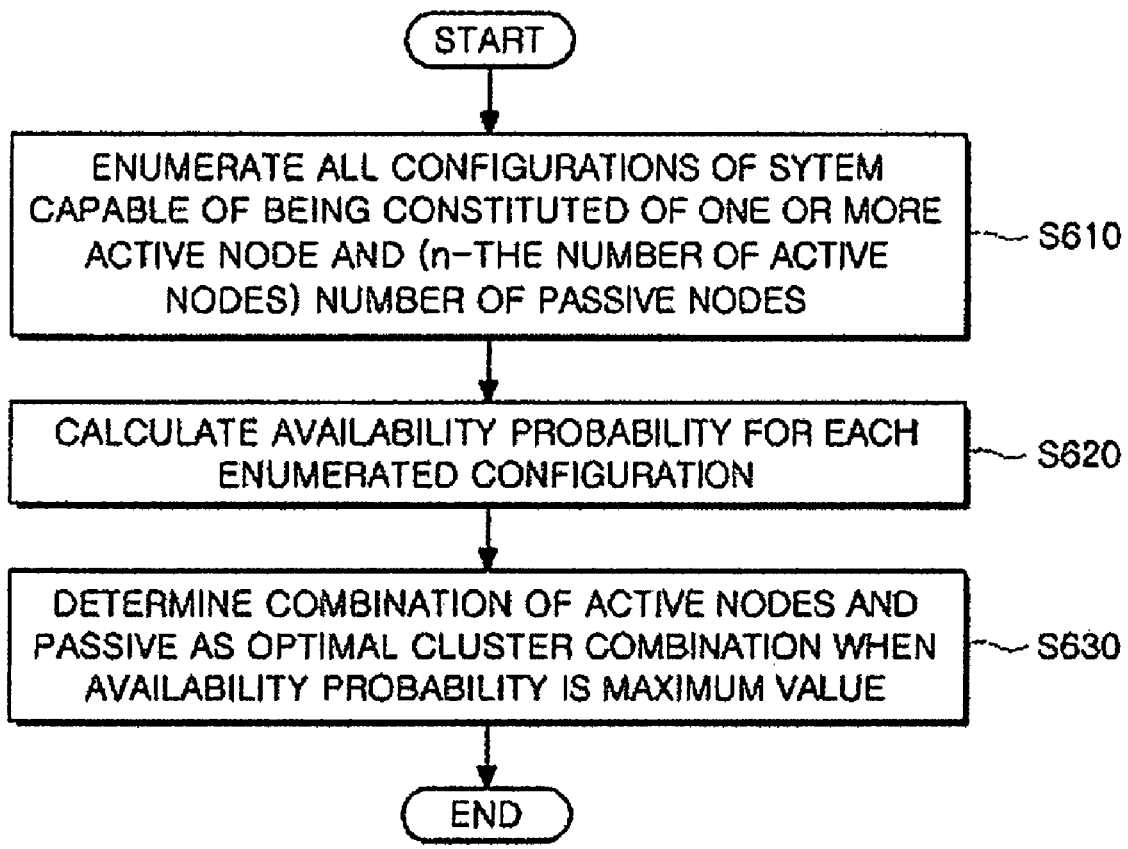
FIG. 6 is a flowchart illustrating a process of determining the number of active and passive nodes among n number of nodes according to an embodiment of the present invention.

FIG. 6 is a flowchart illustrating a process of determining the number of active and passive nodes among n number of nodes according to an embodiment of the present invention. Hereinafter, the process will be described with reference to FIG. 6.

On the assumption that the number of the entire nodes n was determined through the process as illustrated in FIG. 5, the number of the active node and the number of passive node will be determined.

First, in operation S610, all configurations of a cluster system constituted of one or more active nodes and the number of passive nodes (n—the number of the active nodes) are enumerated.

Thereafter, in operation S620, an availability probability for each enumerated configuration is calculated.

In this case, the availability probability according a survival state and a state transition of each node in the corresponding configuration is calculated using the Markov chain.

In operation S630, a configuration of the cluster system when the availability probability is the maximum value is determined as an optimal configuration according to the result of the calculation.

Thereafter, the head nodes constitute the asymmetric cluster according to the determined optimal configuration.

Figure 7:
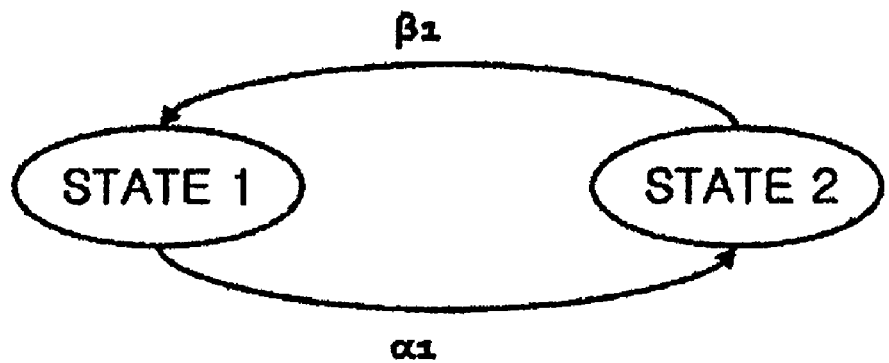
FIGS. 7 through 9 are diagrams illustrating a process of carrying out an availability probability operation of a cluster system using Markov chain according to an embodiment of the present invention.
Figure 8:
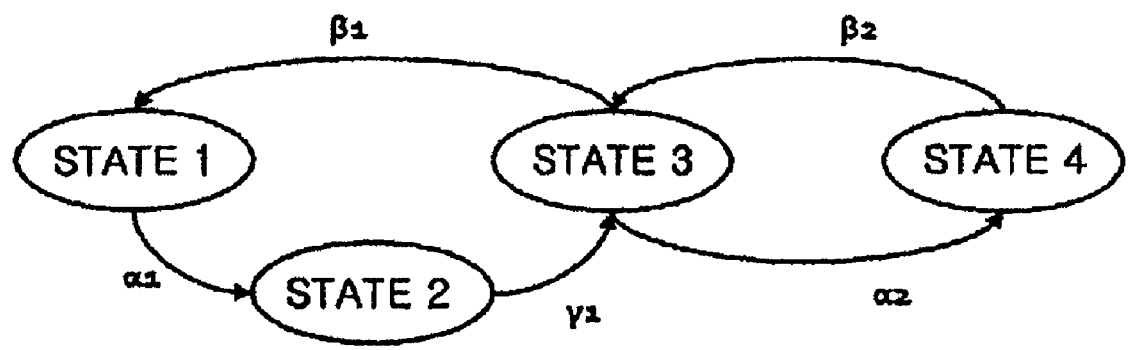
Figure 9:
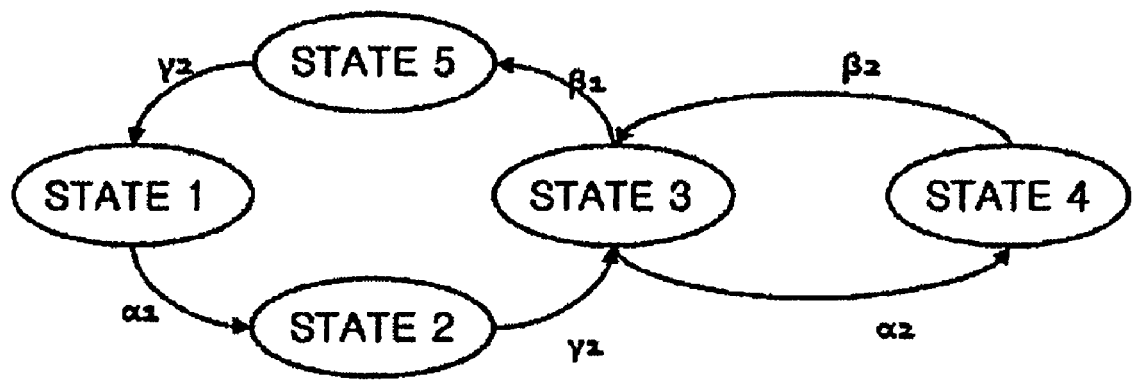

FIGS. 7 through 9 are diagrams illustrating a process of carrying out an availability probability operation of a cluster system using Markov chain according to an embodiment of the present invention.

The Markov chain is a mathematically modeling technique for various management systems, and, at the same time, is a technique for sequentially predicting changes of future states by understanding dynamic properties of various parameters in a system on the basis of changes of past states.

An availability probability in case where one active node exists is illustrated using the Markov chain in FIG. 7.

In this case, there exist two states. A first state is a state that a node is active, and a second state is a state that the node is down.

Assuming that a probability of staying in the first state is $\pi 1$ and a probability of staying in the second state is $\pi 2$, a probability of shifting from the first state to the second state is $\alpha 1$, and a probability of shifting from the second state to the first state is $\beta 1$, an availability probability A becomes $\pi 1$. a mathematical relationship between the other probabilities may be expressed by the following equation (2):

$$\pi 1+\pi 2=1$$
$$\pi 2*\beta 1=\pi 1*\alpha 1$$
$$\pi 1=1/(1+\alpha 1/\beta 1)$$
$$\pi 2=1/(1+\beta 1/\alpha 1) \quad (2)$$

where $\alpha 1$ is a mean time to failure MTTF, and $\beta 1$ is a mean time to repair MTTR.

An availability probability in case where one node is an active node and the other node is a passive node is illustrated using the Markov chain in FIG. 8.

In this case, there exist four states. A first state is a state that the active node and the passive node are active, a second state is a state that the active node is down and the passive node is converted into the active node, a third state is a state that the passive node serves as the active nodes, and a fourth state is a state that all two nodes are down.

Probabilities with respect to each state are expressed by the following equation (3):

$$\pi 1+\pi 2+\pi 3+\pi 4=1$$
$$\pi 3*\beta 1=\pi 1*\alpha 1$$
$$\pi 1*\alpha 1=\pi 2*\gamma 1$$
$$\pi 4*\beta =\pi 3*\alpha 2$$
$$\pi 1=1/(1+\alpha 1/\gamma 1+\alpha 1/\beta 1+\alpha 1*\alpha 2/\beta 1*\beta 2)$$
$$\pi 2=1/(\gamma 1/\alpha 1+1+\gamma 1/\beta 1+\alpha 1*\gamma 1/\beta 1*\beta 2)$$
$$\pi 3=1/(\beta 1/\alpha 1+\beta 1/\gamma 1+1+\alpha 2/\beta 2)$$
$$\pi 4=1/(\beta 2/\alpha 2+\beta 1\beta 2/\gamma 1\alpha 2+\beta 1\beta 2/\alpha 1\alpha 2+1) \quad (3)$$

where the availability probability A is expressed as $A=\pi 1+\pi 3$.

An availability probability in case where all tow nodes are active nodes is illustrated using the Markov chain in FIG. 9.

In this case, there exist four states. Availability probabilities of each state are expressed by the following equation (4):

$$\pi1+\pi2+\pi3+\pi4+\pi5=1$$

$$\pi3*\beta1=\pi5*\gamma2=\pi1*\alpha1=\pi2*\gamma1$$

$$(\alpha2+\beta1)*\pi3=\pi4*\beta2+\pi2*\gamma1$$

$$\pi3*\pi2=\pi4*\beta2$$

$$\pi1=1/(1+\alpha1/\beta1+\alpha1/\gamma1+\alpha1/\gamma2+\alpha1\alpha2/\beta1\beta2)$$

$$\pi2=1/(1+\gamma1/\alpha1+\gamma1/\beta1+\gamma1/\gamma2+\alpha1\gamma1/\beta1\beta2)$$

$$\pi3=1/(1+\beta1/\alpha1+\beta1/\gamma1+\alpha2/\beta2+\beta1/\gamma2)$$

$$\pi4=1/(1+\beta2/\alpha2+\beta1\beta2/\alpha1\alpha2+\beta1\beta2/\alpha2\gamma1+\beta1\beta2/\alpha2\gamma2)$$

$$\pi5=1/(1+\gamma2/\alpha1+\gamma2/\beta1+\gamma2/\gamma1+\alpha2\gamma2/\beta1\beta2) \quad (4)$$

where the availability probability A is expressed as $A=\pi1+\pi3+\frac{1}{2}(\pi2+\pi5)$.

FIG. 10 is a table illustrating an availability probability prediction according to variation of MTTF in a variable active and passive node establishment according to an embodiment of the present invention. FIG. 10 may be considered a table summarizing the cases as illustrated in FIGS. 7 through 9 and other cases.

Referring to FIG. 10, a case 1035 where there are five nodes is less sensitive to small MTTF than cases 1032, 1033 and 1034 where there are four or less nodes. The availability probability (number of nines) 1010 of the case 1035 is larger than that of the cases 1032, 1033 and 1034.

Figure 11:
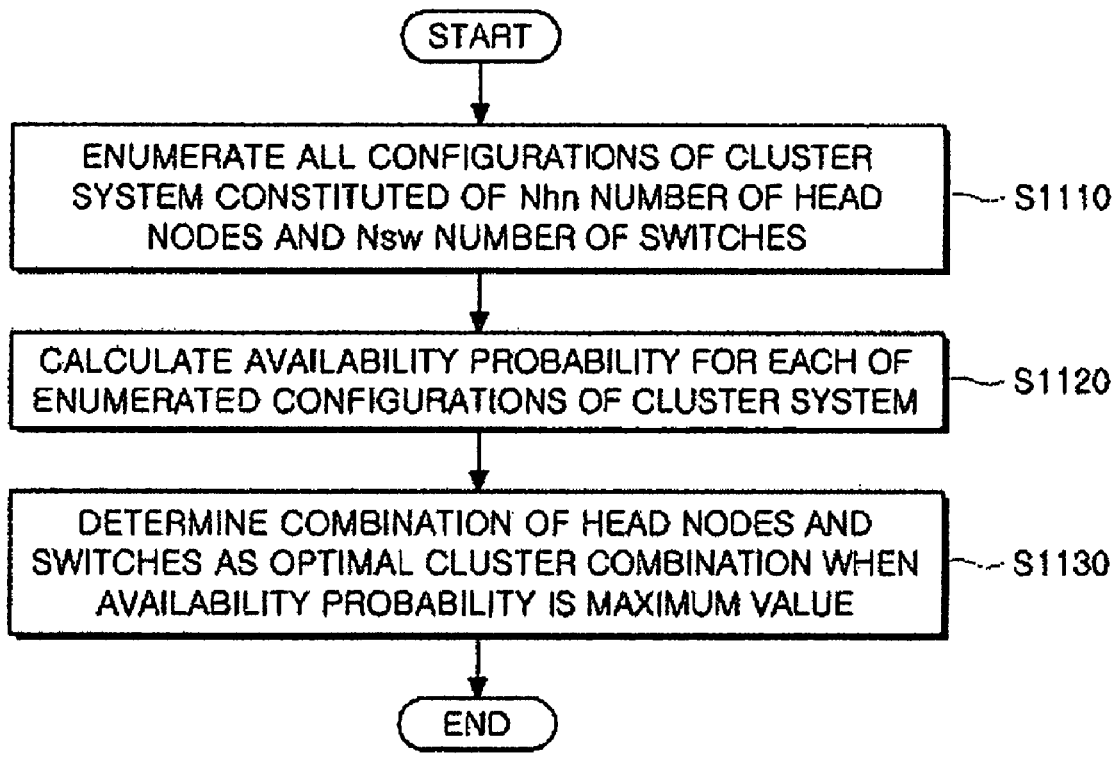
FIG. 11 is a flowchart illustrating a process of determining the number of head nodes and the number of switches when an availability probability is maximum value regarding a cluster system according to an embodiment of the present invention.

FIG. 11 is a flowchart illustrating a process of determining the number of head nodes and the number of switches when an availability probability is maximum value regarding a cluster system according to an embodiment of the present invention.

In operation S1110, all configurations of cluster systems constituted of $N_{hn}$ number of head nodes and $N_{sw}$ number of switches are enumerated.

When the number of the entire nodes is U ($1 \leq U$), $N_{hn}$ is $1 \leq N_{hn} \leq U$, $N_{sw}$ is $1 \leq N_{sw} \leq U$, and $N_{hn}$ and $N_{sw}$ may be the same value.

Thereafter, in operation S1120, an availability probability $P_{hn-sw}$ for each configurations of the cluster systems is calculated by the following equation (5), in which the availability probability according a survival state and a state transition of each head node and each switch in the corresponding configuration is calculated using the Markov chain:

$$P_{hn-sw} = \sum_{k \in U} \pi_k = \frac{T}{E} \quad (5)$$

$$T = \sum_{i=0}^{N_{sw}-1} \frac{N_{sw}!}{(N_{sw}-1)!} \left(\frac{\lambda_{sw}}{\delta_{sw}}\right)^i \left(1 + \sum_{j=1}^{N_{hn}-1} \frac{N_{hn}!}{(N_{hn}-j)!}\left(\frac{\lambda_{hn}}{\delta_{hn}}\right)^j\right)$$

$$E = T + \sum_{i=0}^{N_{sw}-1} \frac{N_{sw}!}{(N_{sw}-i)!}\left(\frac{\lambda_{sw}}{\delta_{sw}}\right)^i N_{hn}!\left(\frac{\lambda_{hn}}{\delta_{hn}}\right)^{N_{hn}} +$$

$$\sum_{j=1}^{N_{hn}-1} \frac{N_{hn}!}{(N_{hn}-j)!}\left(\frac{\lambda_{hn}}{\delta_{hn}}\right)^j N_{sw}!\left(\frac{\lambda_{sw}}{\delta_{sw}}\right)^{N_{sw}}$$

$$\lambda_\theta = \frac{1}{MTTF}$$

$$\delta_\theta = \frac{1}{MTTR}$$

$$\theta \in \{hn, sw\}$$

where T is a probability that the system survives, E is an entire probability of the system, and $\pi_k$ is a probability for each state.

According to the result of the calculation, in operation S1130, a combination between the head nodes and the switches when the availability probability is the maximum value is determined as an optimal cluster combination.

The optimal number of the nodes is determined by checking if the availability probability $P_{hn-sw}$ for the number of nodes of a certain range meets a pre-established reference availability probability.

Figure 12:
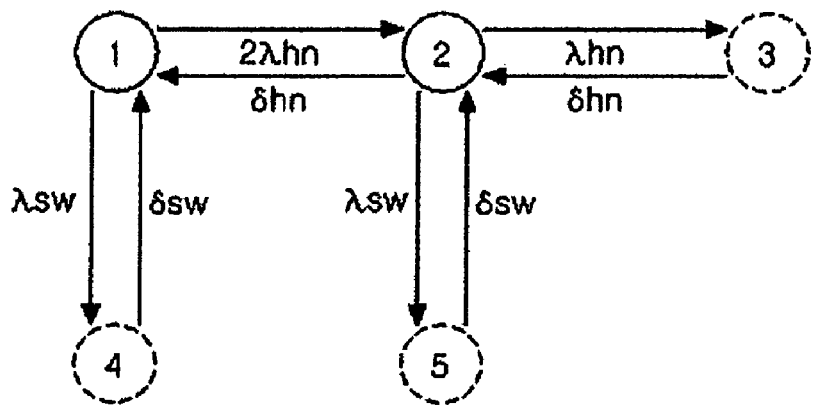
FIG. 12 is a diagram illustrating an availability probability prediction of a cluster system by means of a continuous-time Markov chain (CTMC) according to an embodiment of the present invention.

FIG. 12 is a diagram illustrating an availability probability prediction of a cluster system by means of a continuous-time Markov chain (CTMC) according to an embodiment of the present invention. Hereinafter, the availability probability prediction will be described with reference to FIG. 12 and Table 1:

| State | Head node | Switch | System state |
|---|---|---|---|
| State 1 | 2 | 1 | active |
| State 2 | 1 | 1 | active |
| State 3 | 0 | 1 | down |
| State 4 | 2 | 0 | down |
| State 5 | 1 | 0 | down |

In the above table 1, the first state is a state that two head nodes and one switch survive, the second state is a state that one head node and one switch survive, the third state is a state that only one switch survives, the fourth state is a state that only two head nodes survive, and the fifth state is a state that only one head node survives.

In this case, the first and second states are in active state, the third, fourth and fifth states are in down state.

Hereinafter, each probability for each state and state variations will be described using the CTMC.

Since two head nodes survive, a probability of shifting from the first state to the second state is 2λ hn. Furthermore, since one head node survives, a probability of shifting from the second state to the third state is λ hn. Similarly, probabilities of shifting from the third state to the second state and shift from the second state to the first state are δ hn.

Furthermore, since one switch survives, probabilities of shifting from the first state to the fourth state and shifting from the second state to the fifth state are λ sw, and probabilities of shifting from the fourth state to the first state and shifting from the fifth state to the second state are δ sw.

According to the presenting invention, an optimal configuration of nodes is possible because individual probability of a cluster system can be predicted according to the number of nodes and node components.

In a method for predicting an availability of a high availability cluster according to embodiments of the present invention, the optimal number of nodes in the high availability cluster system can be determined according to a required availability level.

In addition, since a configuration of a relatively high availability system can be predicted using a predetermined number of nodes, it is possible to accomplish an optimal high availability cluster system.

Furthermore, a future state of the system can effectively be predicted from a past state of the system by predicting the availability of the high availability cluster by Markov chain.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for predicting an availability of a high availability cluster, the method comprising:

calculating, by a computer of a cluster system, a basic survival probability that the other node survives until a failure on one node of two nodes constituting a cluster is fixed; and determining, by the computer of the cluster system, an optimal number of nodes meeting a preset reference availability probability by calculating an availability probability for a predetermined range of the number of nodes on the basis of the basic survival probability, wherein the availability probability, which is a probability that other nodes survive until a failure on one node of entire nodes is fixed, is calculated by the following equation:

$$P_n = P_1^{n-1} + \sum_{k=Q_n}^{n-2} P_1^k (1-P_1)^{n-k-1} \frac{(n-1)!}{(n-k-1)!}$$

$$Q_n = \left[\frac{n+1}{2}\right]$$

where $P_n$ is the availability probability, $Q_n$ is a quorum, $P_1$ is the basic survival probability, k indicates a quorum number, n indicates a node number, and n is an integer more than 1.

2. A method for predicting an availability of a high availability cluster, the method comprising:

enumerating, by a computer of a cluster system, all configurations of a cluster system variable with the number of head nodes and the number of switches;

calculating, by the computer of the cluster system, an availability probability for each of the enumerated configurations; and determining, by the computer of the cluster system, a combination between the head nodes and the switches when the availability probability is the maximum value as an optimal configuration of the cluster, wherein the availability probability according a survival state and a state transition for each head node and each switch in the corresponding combination is calculated using a Markov chain, wherein the availability probability is obtained by omitting a survival probability of the system from an entire probability of the system, and wherein the survival probability of the system is calculated by the following equation:

$$T = \sum_{i=0}^{N_{sw}-1} \frac{N_{sw}!}{(N_{sw}-1)!} \left(\frac{\lambda_{sw}}{\delta_{sw}}\right)^i \left(1 + \sum_{j=1}^{N_{hn}-1} \frac{N_{hn}!}{(N_{hn}-j)!} \left(\frac{\lambda_{hn}}{\delta_{hn}}\right)^j\right)$$

$$\lambda_\theta = \frac{1}{MTTF}$$

$$\delta_\theta = \frac{1}{MTTR}$$

$$\theta \in \{hn, sw\}$$

where T is the survival probability of the system, $N_{hn}$ is the number of the head nodes, $N_{sw}$ is the number of the head nodes, MTTF is a mean time to failure, and MTTR is a mean time to failure, $\lambda$ indicates a probability, $\delta$ indicates a set, hn indicates a head node number, and sw indicates a switch number.

3. A method for predicting an availability of a high availability cluster, the method comprising:

enumerating, by a computer of a cluster system, all configurations of a cluster system variable with the number of head nodes and the number of switches;

calculating, by the computer of the cluster system, an availability probability for each of the enumerated configurations; and determining, by the computer of the cluster system, a combination between the head nodes and the switches when the availability probability is the maximum value as an optimal configuration of the cluster, wherein the availability probability according a survival state and a state transition for each head node and each switch in the corresponding combination is calculated using a Markov chain, wherein the availability probability is obtained by omitting a survival probability of the system from an entire probability of the system, and wherein the entire probability of the system is calculated by the following equation:

$$E = T + \sum_{i=0}^{N_{sw}-1} \frac{N_{sw}!}{(N_{sw}-i)!} \left(\frac{\lambda_{sw}}{\delta_{sw}}\right)^i N_{hn}! \left(\frac{\lambda_{hn}}{\delta_{hn}}\right)^{N_{hn}} +$$

$$\sum_{j=1}^{N_{hn}-1} \frac{N_{hn}!}{(N_{hn}-j)!} \left(\frac{\lambda_{hn}}{\delta_{hn}}\right)^j N_{sw}! \left(\frac{\lambda_{sw}}{\delta_{sw}}\right)^{N_{sw}}$$

$$\lambda_\theta = \frac{1}{MTTF}$$

$$\delta_\theta = \frac{1}{MTTR}$$

$$\theta \in \{hn, sw\}$$

where E is the entire probability of the system, $N_{hn}$ is the number of the head nodes, $N_{sw}$ is the number of the switches, $\lambda$ indicates a probability, $\delta$ indicates a set, hn indicates a head node number, and sw indicates a switch number.

* * * * *